(No Model.)
G. A. ANDERSON.
UNIVERSAL COUPLING.
No. 536,057. Patented Mar. 19, 1895.
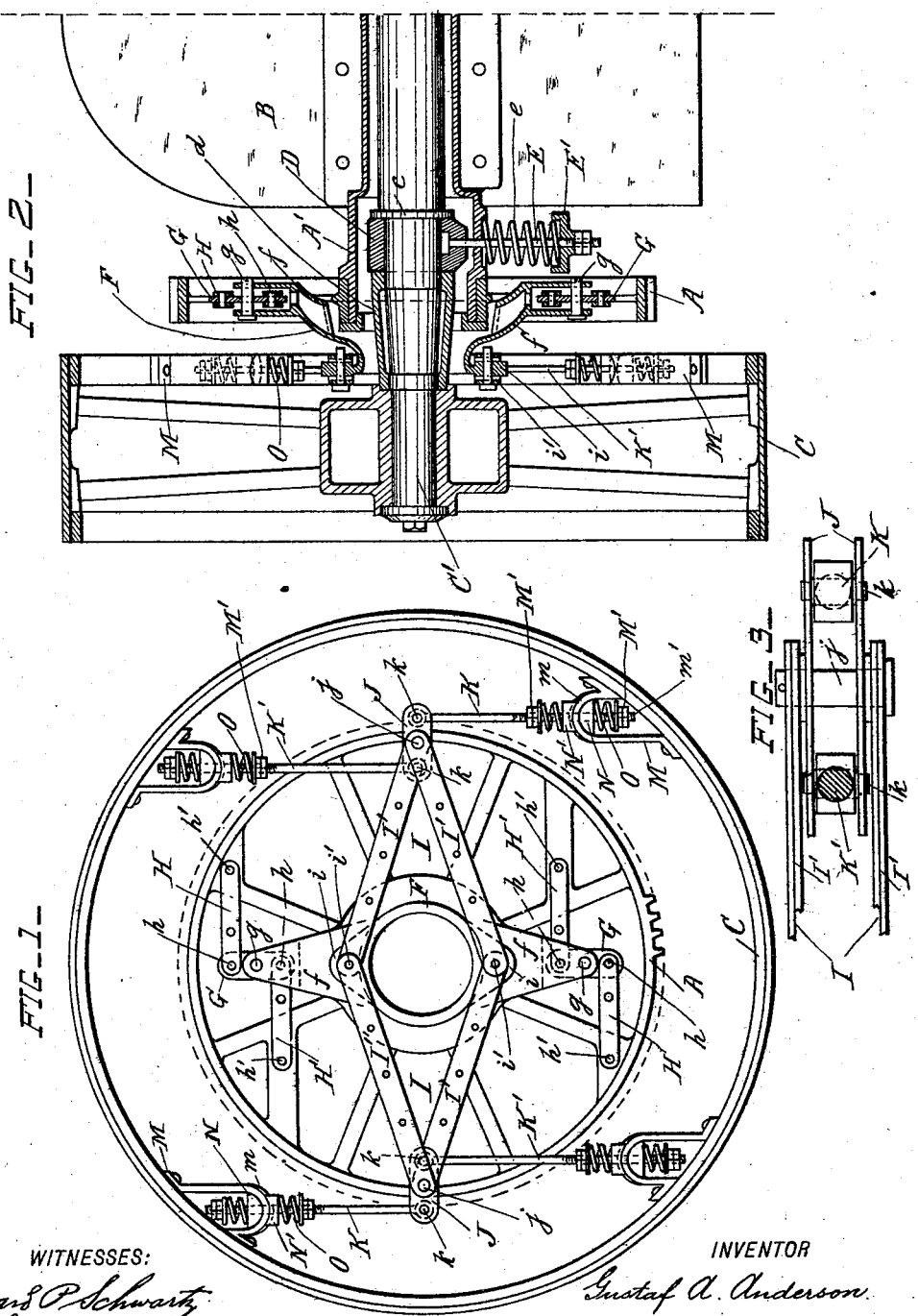
WITNESSES:
INVENTOR
Gustaf A. Anderson
BY Herbert W. T. Jenner
ATTORNEY.

UNITED STATES PATENT OFFICE.

GUSTAF ARVID ANDERSON, OF WAYNESBOROUGH, PENNSYLVANIA, ASSIGNOR TO THE GEISER MANUFACTURING COMPANY, OF SAME PLACE.

UNIVERSAL COUPLING.

SPECIFICATION forming part of Letters Patent No. 536,057, dated March 19, 1895.

Application filed December 1, 1894. Serial No. 530,610. (No model.)

*To all whom it may concern:*

Be it known that I, GUSTAF ARVID ANDERSON, a subject of the King of Sweden and Norway, residing at Waynesborough, in the county of Franklin and State of Pennsylvania, have invented certain new and useful Improvements in Universal Couplings; and I do hereby declare the following to be a full, clear, and exact description of the invention, such as will enable others skilled in the art to which it appertains to make and use the same.

This invention relates to universal couplings for wheels and shafts, and is more particularly applicable to coupling the main toothed wheel of a traction engine to its road or driving wheel.

This invention consists in the novel construction and combination of the parts hereinafter fully described and claimed whereby the axis of one wheel is permitted to move freely in every direction with respect to the axis of another wheel without affecting the synchronous rotation of the said wheels which are always operatively coupled together.

In the drawings: Figure 1 is a front view of the universal coupling. Fig. 2 is a vertical section through the coupling, showing it applied to the road wheel of a traction engine. Fig. 3 is a detail view of one of the links J and its attachments.

A is a revoluble wheel or its equivalent, such as a plate, ring or disk, which forms one member of the coupling. This wheel A as shown in the drawings is the main toothed driving wheel of a traction engine, and is journaled on the tubular bearing A' which is rigidly secured to the boiler B. Motion is imparted to the wheel A from a steam engine and intermediate driving wheels of any approved construction, which are not shown in the drawings as they do not form a part of the present invention.

C is a revoluble wheel or its equivalent, such as a plate, ring or disk, which forms the other member of the coupling. This wheel C as shown in the drawings is the road wheel of a traction engine, and is journaled on the end of the shaft C'. The shaft C' passes through the tubular bearing A'.

D is a bearing block encircling the shaft C', and d is a distance piece arranged between the block D and the hub of the road wheel. The shaft C' has a collar c which bears against the block D on the other side of it from the distance piece.

E is a bolt connected to the block D and passing through a hole in the bottom of the tubular bearing A'.

E' is a plate secured to the projecting end of the bolt E, and e is a spring interposed between the plate E' and the under side of the bearing A'.

In order that the wheel C may be revolved by the wheel A, and at the same time be free to move in every direction, a frame F is interposed between the two wheels and is separately connected to them by links.

The frame F has equalizing links G pivoted to it by the pins g which are preferably arranged on opposite sides of its axis and at equal distances from it. The frame F is preferably provided with arms f having forked ends for carrying the pins g, and the links G are arranged in the said forked ends.

H H' are connecting links which are pivoted to the opposite ends of the links G by the pins h and to the wheel A by the pins h'. The links H and H' extend in opposite directions so that when the wheel revolves the links H are in tension and the links H' in compression, or the reverse according to the direction of motion, and all the links assist equally in transmitting motion to the frame F.

Each link H and H' preferably consists of two plates so that the strains may come equally upon the ends of the pins. The two plates forming each link may be braced together by bolts or rivets, or each link may be formed in a single piece and provided with forked ends. The frame F is also provided with arms I. These arms preferably consist of links I' secured to the lugs i on the main part of the frame by the pins i', but the arms I may be formed integral with the main part of the frame if desired, and they are then preferably provided with forked ends.

J are equalizing links pivoted to the ends of the arms I by the pins j. These links J are preferably arranged in the forked ends of the arms, or between the ends of the links I' when the arms are formed of links. The links I' are preferably braced together in pairs by bolts or rivets as shown in the drawings. The links J also preferably consist of pairs of links, each said pair of links being the mechanical equivalent of, and performing the same function as, a single link with forked ends.

K and K' are connecting links or rods pivoted to the opposite ends of the links J by the pins $k$. The rods K and K' extend in opposite directions so that when one rod is in tension the other rod is in compression.

The ends of the rods K and K' are operatively connected to the wheel C in any approved manner. The means for connecting the said rods to the wheel C preferably consist of the brackets M secured to the wheel and provided with concavo-convex loops $m$. The rods each have screwthreaded ends $m'$, which pass through holes in the loops $m$ and are provided with nuts M'.

N is a convex washer bearing against the inside of each loop, and N' is a concave washer bearing against its outside.

O are springs interposed between the nuts M' and the washers N and N' to prevent the parts from being broken when the direction of motion is reversed suddenly.

The looped brackets and the washers N and N' form universal joints which permit the rods to have a limited play in every direction with respect to the wheel C to which they are connected.

The weight of the boiler tends to depress the axis of the wheel A below that of the wheel C against the pressure of the spring $e$, and as the engine travels over rough ground the axis of the wheel A vibrates vertically. When the axes of the two wheels are thus moved out of line in any direction, the equalizing links G and J turn upon their central pivots, but as the lengths of the links H H' and the rods K K' remain the same, the natural motion of one axis past the other in a line substantially perpendicular to the ground is not interfered with. The amount of motion of the respective links G and J varies according to their position, and the links which happen to be in line with the vertical line of motion remain substantially without movement. When the links G and J are in inclined positions they all move upon their pivots, but the continuity of the rotary motion communicated through the frame and its links, from one wheel to the other, is never in any way changed or affected.

The universal joints and the elasticity of the links permit the wheel C to move out of parallel with the wheel A, as is necessary because in passing over rough ground the vibrations of the wheel A on one side of the traction engine are never continuous in a truly vertical plane, and the axis of the wheel A is often at a slight angle to the axis of the wheels C.

The pivot pins need not fit closely in the end holes of the links, because the equalizing links G and J turn automatically on their central pivot pins and always equalize the strains on the links and rods which transmit the motion of one wheel to the other.

It is obvious that the universal coupling hereinbefore described can be used to connect two shafts by securing the members A and C of the coupling upon their respective supporting shafts.

The frame F might be connected to each of the coupling members by one equalizing link and two connecting links only, but the arrangement shown in Fig. 1 is preferred as it distributes the strains around the members of the coupling.

What I claim is—

1. In a universal coupling, the combination, with the two revoluble members of the coupling, of a frame interposed between the said members, two equalizing links pivoted centrally to the said frame, two connecting links pivoted to the ends of one equalizing link and connected on opposite sides thereof to one of the coupling members, and two connecting links pivoted to the ends of the other equalizing link and connected on opposite sides thereof to the other member of the coupling, whereby the said members are constrained to revolve synchronously and their axes are free to move out of line in every direction.

2. In a universal coupling, the combination, with the two revoluble members of the coupling, of a frame interposed between the said members, the equalizing links G pivoted centrally to the said frame, the links pivoted to the ends of the links G and connected to one coupling member on opposite sides of the links G, the equalizing links J pivoted centrally to the said frame intermediate of the links G, and the links pivoted to the ends of the links J and connected to the other coupling member on the opposite sides of the links J.

3. In a universal coupling, the combination, with the two revoluble members of the coupling, of a frame interposed between the said members, equalizing links pivoted centrally to the said frame, separate sets of connecting links pivoted to the ends of the equalizing links and connected to the respective members of the coupling on opposite sides of the equalizing links to which they pertain, and universal joints connecting the ends of one set of links to their coupling member, whereby one coupling member is free to move out of parallel with the other.

4. The combination, with a stationary tubular bearing, and a wheel A journaled thereon; of a spring-supported shaft passing through the said bearing, a wheel C journaled on the end of the said shaft, a frame interposed between the said wheels, the equalizing links G and J pivoted centrally to the said frame, the links H H' pivoted to the links G and to the wheel A, and the rods K K' pivoted to the links J and connected to the wheel C, substantially as and for the purpose set forth.

5. The combination, with the two wheels A and C, of the frame interposed between the said wheels and provided with the arms $f$ and I arranged in different planes, the equalizing links G pivoted centrally to the arms $f$, the links pivotally connecting the links G and wheel A, the equalizing links J pivoted centrally to the arms I, and the rods pivotally connecting the links J with the wheel C, substantially as and for the purpose set forth.

In testimony whereof I affix my signature in presence of two witnesses.

GUSTAF ARVID ANDERSON.

Witnesses:
J. A. MIDDOWER,
WM. G. EPPLEY.